United States Patent
Verneret

(10) Patent No.: US 8,489,338 B2
(45) Date of Patent: Jul. 16, 2013

(54) METHOD FOR ESTIMATING THE CONCENTRATION OF A CHEMICAL ELEMENT IN THE PRIMARY COOLANT OF A NUCLEAR REACTOR

(75) Inventor: Claude Verneret, Cergy (FR)

(73) Assignee: Areva NP, Courbevoie (FR)

( * ) Notice: Subject to any disclaimer, the term of this patent is extended or adjusted under 35 U.S.C. 154(b) by 782 days.

(21) Appl. No.: 12/521,422

(22) PCT Filed: Dec. 21, 2007

(86) PCT No.: PCT/FR2007/002155
§ 371 (c)(1),
(2), (4) Date: Oct. 23, 2009

(87) PCT Pub. No.: WO2008/093026
PCT Pub. Date: Aug. 7, 2008

(65) Prior Publication Data
US 2011/0004417 A1    Jan. 6, 2011

(30) Foreign Application Priority Data

Dec. 26, 2006  (FR) ................... 06 11383

(51) Int. Cl.
*G01N 31/00*   (2006.01)
*G21C 17/00*   (2006.01)
(52) U.S. Cl.
USPC ........................................... 702/23; 376/245

(58) Field of Classification Search
USPC ................. 702/23; 376/207, 245; 204/157.45
See application file for complete search history.

(56) References Cited

U.S. PATENT DOCUMENTS

| | | | |
|---|---|---|---|
| 4,204,259 | A | 5/1980 | Yabe |
| 4,814,050 | A | 3/1989 | McGraw et al. |
| 6,539,311 | B1 | 3/2003 | Berger |
| 2003/0190253 | A1 | 10/2003 | Kohler et al. |
| 2009/0162278 | A1* | 6/2009 | Ravn et al. ............... 424/1.37 |

FOREIGN PATENT DOCUMENTS

GB       1532071 A       11/1978

\* cited by examiner

*Primary Examiner* — Bryan Bui
(74) *Attorney, Agent, or Firm* — Novak Druce Connolly Bove + Quigg LLP

(57) ABSTRACT

In a process for estimating the concentration (C) of a chemical element in the primary coolant of a nuclear reactor, a dilution solution or a concentrated solution of said chemical element in a predetermined concentration (C*) is injected into the primary coolant within the reactor, and the reactor includes a sensor capable of measuring a quantity ($C_m$) representing the concentration of said chemical element. The process is an iterative process in which repeatedly in each time step k: a stage of acquiring quantities ($q_{dk}$) and ($q_{ck}$) representing the injected flows of dilution solution and concentrated solution in step k, and a quantity ($C_{mk}$) representing the concentration measured by the sensor; a stage of calculating an estimated value ($C_{ek+1}$) of the concentration of said chemical element in the primary coolant in step k+1 on the basis of representative quantities ($q_{dk}$, $q_{ck}$, $C_{mk}$) acquired in stage k.

9 Claims, 6 Drawing Sheets

METHOD FOR ESTIMATING THE CONCENTRATION OF A CHEMICAL ELEMENT IN THE PRIMARY COOLANT OF A NUCLEAR REACTOR

CROSS REFERENCE TO RELATED APPLICATIONS

This application is a National Phase filing under 35 U.S.C. §371 of PCT/FR2007/002155 filed Dec. 21, 2007, which claims priority to Patent Application No. 0611383, filed in France on Dec. 26, 2006. The entire contents of each of the above-applications are incorporated herein by reference.

FIELD OF THE INVENTION

The invention relates in general to processes for estimating the concentration of a chemical element in the primary coolant of a nuclear reactor, in particular boron.

More specifically the invention relates to a process for estimating the concentration C of a chemical element in the primary coolant of a nuclear reactor, this reactor comprising means for injecting a dilution solution having a concentration of the said chemical element which is below a predetermined limit into the primary coolant, means for injecting a concentrated solution of the said chemical element in a predetermined concentration $C^*$ into the primary coolant, and a sensor capable of measuring a quantity $C_m$ representing the concentration C of the said chemical element in the primary coolant.

BACKGROUND OF THE INVENTION

In nuclear reactors in which the primary coolant is essentially water, as for example in pressurised water reactors, the reactivity of the reactor core is controlled among other things by adding boron to the primary coolant. Boron is a neutron poison, which absorbs some of the neutron flux generated by the nuclear reactions in the reactor core. Thus when the boron concentration of the primary coolant increases, the heat released by the core of the reactor decreases. Conversely, when the boron concentration in the primary coolant decreases, the heat released by the reactor core increases.

The boron concentration in the primary coolant is adjusted automatically or manually in relation to set reactor control levels, for example in relation to the setting for the electrical power which the reactor has to provide to the high voltage electricity distribution grid.

With this object the reactor is provided with a circuit known as the REA. This circuit comprises means for injecting a solution comprising essentially water and not containing boron into the primary coolant with a view to downwardly adjusting the boron concentration in the primary coolant. The REA circuit also comprises means for injecting a concentrated solution containing 7000 ppm of boron into the primary coolant in order to adjust the boron concentration in the primary coolant upwards. In both cases the volume of primary coolant is maintained constant by removing from the primary circuit a volume of liquid corresponding to the volume injected.

It is thus very important for control of the nuclear reactor to know the boron concentration in the primary coolant at all times.

With this object the reactor is provided with one or more sensors (boron meters) designed to measure the boron concentration in the primary coolant.

The boron concentration of the primary coolant measured automatically by the boron meter is inaccurate (noise of the order of 7%) and is provided after a significant delay, of the order of some twenty minutes.

In order to overcome the measurement delay, the boron concentration in the primary coolant can be estimated by integrating the flows of water and concentrated solution injected into the primary coolant via the REA. These flows underlie changes in the boron concentration.

The flow integration method is based on the following equations.

The change dC in the boron concentration C of the primary coolant for a constant mass of primary coolant M is caused by injecting a charge of liquid having a boron concentration $C^*$ (concentrated boron or water solution) and by simultaneously removing a charge of primary coolant having concentration C. The mass balance is therefore written as:

$$MdC = C^*dm - Cdm$$

where dm is the mass of both the charge of liquid injected and the charge of primary coolant withdrawn, where $C^*=0$ ppm for a dilution and $C^*=7000$ ppm for the injection of a concentrated boron solution.

If it is assumed that the injected and withdrawn flows are constant and the same, the balance becomes:

$$MdC = (C^* - C)qdt$$

where q is the injected/withdrawn flow and dt is a time interval.

By integrating we obtain:

$$\ln(C(t) - C^*) = \ln(C(0) - C^*) - \frac{q}{M}t$$

where $C(0)$ is the boron concentration in the primary coolant at $t=0$, that is $$C(t) = C^* + (C(0) - C^*)e^{-\frac{q}{M}t}$$

or also $$(C^* - C(t)) = (C^* - C(0))e^{-\frac{q}{Vol}t}$$

if q is no longer a mass flow but a volume flow, Vol being the volume of primary coolant.

This process has the advantage that it allows the change in boron concentration after the end of the action of dilution or injection of concentrated boron solution (boron addition) to be quickly estimated. The fact that the delays associated with the time required for the charge to flow through the primary circuit and the time required for the injected charge to become diluted and for the boron concentration to become uniform in the primary coolant are not taken into account brings forward estimation of the boron concentration by some ten minutes.

The above equations can be used to simulate different types of action (dilution or boron addition) for a constant injection flow, and also to simulate a stationary situation (no injection). They provide the final concentration (after the action) on the basis of an initial concentration (before the action). It is therefore necessary to update the starting concentration C(0) before each action, and this enables an iterative approach to be used.

In this iterative approach, the following equation is applied to each time step k:

$$(C^* - C_{k+1}) = (C^* - C_k)e^{-\frac{q}{Vol}\Delta t}$$

where $C_k$ is the estimated boron concentration in the primary coolant in step k, C* being chosen to be 0 or 7000 ppm, as before, depending on whether the action in progress is dilution or boron addition. $\Delta t$ is the duration of a time step.

The first disadvantage of the process of integrating flows is that there is long term drift in the estimated value in relation to the actual value (see for example FIG. 2). This drift arises from cumulated errors in each time step, due for example to the difference between the flow q used by the equations and the actual injected flow.

The second disadvantage arises from the initialisation stage, which is required for an iterative process of this kind. Initialisation must be as accurate as possible, otherwise the results will be skewed at each time step. It can be done by selecting a mean of the measurements made by the boron meter over a given time as an initial value C0 for the boron concentration in the primary coolant. In the case of FIGS. 2 and 4 to 6 the iterative process (line 2) has been initialised using the mean of the values found during the four hours preceding the start of the process. In this case it is however impossible to be sure that the mean obtained represents the actual boron concentration at the moment when the iterative process started. Initialisation may also be carried out by using the boron concentration measured by chemical determination as the initial value, which is accurate, but tedious and not very fast.

In any event, the cumulative effect of these two disadvantages results in this method being not very robust.

Furthermore, the process using the integration of flows ignores other sources of variation in boron concentration, such as for example the injection of fluid into the primary circuit from the pressuriser, the RCV tank, the demineralisation filters, etc.

SUMMARY OF THE INVENTION

In this context the intention of the invention is to provide a process of estimation which is more robust than the process of integrating flows.

With this object, the invention relates to an estimation process of the aforesaid type, characterised in that the process is an iterative process comprising repeatedly at each time step k:
- a stage of acquisition of a quantity ($q_{dk}$) representing the injected flow of the dilution solution in step k, a quantity ($q_{ck}$) representing the injected flow of concentrated solution in step k, and a quantity ($C_{mk}$) representing the concentration of the said chemical element measured by the sensor in the primary coolant;
- a stage of calculating an estimated value ($C_{ek+1}$) for the concentration of the said chemical element in the primary coolant in step k+1 based on the representative quantities ($q_{dk}$, $q_{ck}$, $C_{mk}$) acquired in step k.

The process may also have one or more of the following characteristics, considered individually or in all technically possible combinations:

- the calculation stage is carried out using Kalman equations;
- the stage of calculation in step k is carried out considering a state parameter x=ln(C) in the Kalman equations when the quantity ($q_{ck}$) representing the injected flow of concentrated solution is below a predetermined limit, and a state parameter x=ln(C*−C) when the quantity ($q_{ck}$) representing the injected flow of the concentrated solution is above the said predetermined limit;
- the stage of calculation in step k is carried out by considering a measured parameter y=ln($C_m$) in the Kalman equations when the quantity $q_{ck}$ representing the injected flow of concentrated solution is below a predetermined limit, and a state parameter y=ln(C*−$C_m$) when the quantity $q_{ck}$ representing the injected flow of concentrated solution is above the said predetermined limit;
- the equations used in the calculation stage are:

$$x_{k+1/k} = x_{k/k} + u_k$$

$u_k = -(\Delta t_k/Vol)q_{dk}$ when the quantity ($q_{ck}$) representing the injected flow of the concentrated solution in step k is below a predetermined limit $u_k = -(\Delta t_k/Vol)q_{ck}$ when the quantity ($q_{ck}$) representing the injected flow of a concentrated solution in step k is above a predetermined limit $$P_{k+1/k} = P_{k/k} + W$$

$$x_{k+1/k+1} = x_{k+1/k} + K_{k+1}(y_{k+1} - x_{k+1/k})$$

$$P_{k+1/k+1} = (1 - K_{k+1})P_{k+1/k}$$

$$K_{k+1} = P_{k+1/k}/(P_{k+1/k} + V)$$

where $x_{k/k}$ is the value of state parameter x in step k determined on the basis of data available in step k, $\Delta t_k$ is the duration of time step k, Vol is the volume of the primary circuit, $P_{k/k}$ is the variance of state parameter x in step k determined from data available in step k, and W and V are predetermined constants;
- the ratio V/W lies between 100 and 10000;
- the process comprises an initialisation stage during which an estimated initial value $C_{e0}$ of the concentration of the said chemical element in the primary coolant is calculated directly from the quantity $C_{m0}$ representing the concentration of the said chemical element measured by the sensor in the primary coolant;
- the chemical element is boron or a boron compound, and the nuclear reactor is a pressurised water nuclear reactor.

BRIEF DESCRIPTION OF THE DRAWINGS

Other features and advantages will be apparent from the detailed description provided below by way of indication and without being in any way restrictive, with reference to the appended figures, in which.

DETAILED DESCRIPTION OF THE PREFERRED EMBODIMENT

Figure 1:
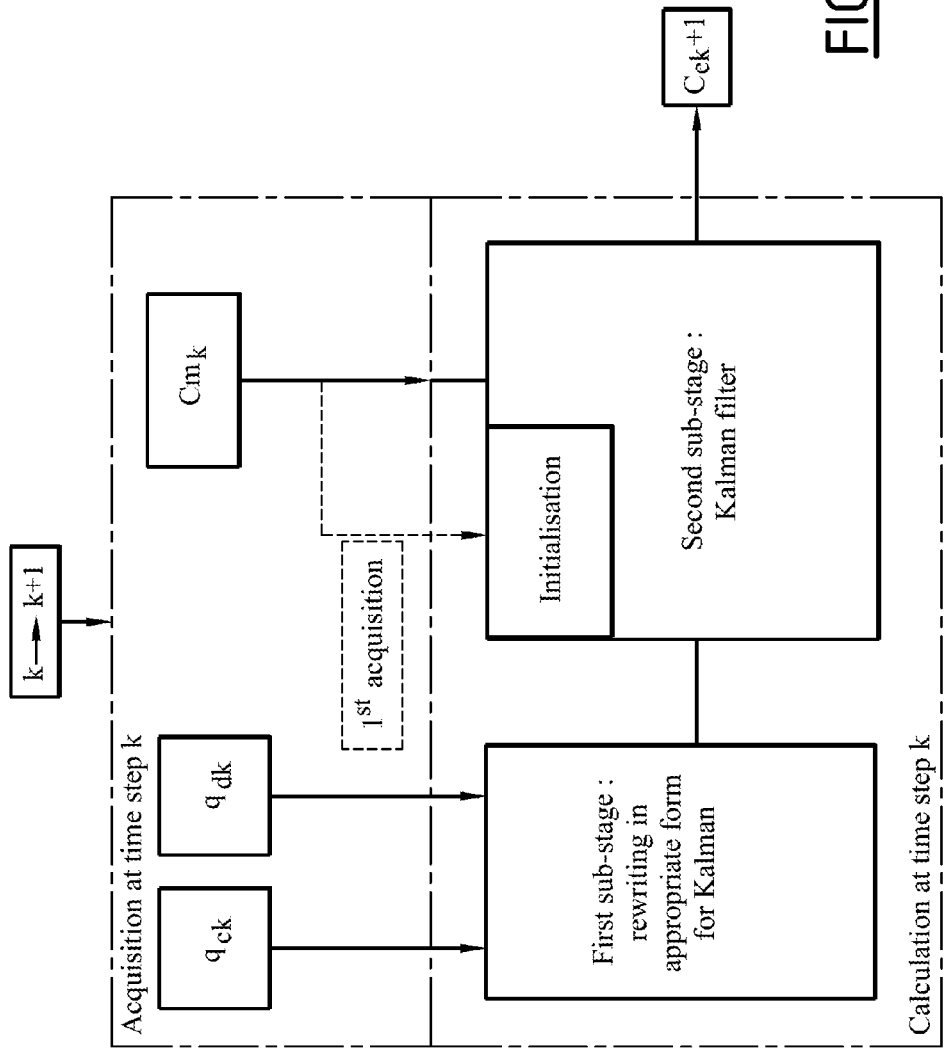
FIG. 1 is a block diagram showing the main stages in the process according to the invention.

The process shown diagrammatically in FIG. 1 is intended to estimate the boron concentration C in the primary coolant of a nuclear reactor.

This reactor, as described above, comprises means for injecting a dilution solution having a concentration of the said chemical element which is below a predetermined limit into the primary coolant, means for injecting a concentrated solution of the said chemical element having a predetermined concentration $C^*$ into the coolant, and a sensor capable of measuring a quantity $C_m$ representing the concentration of the said chemical element in the primary coolant.

The injection means comprise the reactors REA circuit, which is capable of injecting water not containing boron (dilution solution), or a concentrated solution, for example at a concentration $C^*$ of 7000 ppm of boron. The REA circuit is known and will not be described here.

The process is an iterative process comprising:
an initialisation stage;
then, repeatedly, at each time step k:
a stage of acquisition of a quantity $q_{dk}$ representing the injected flow of the dilution solution in step k, a quantity $q_{ck}$ representative of the injected flow of concentrated solution in step k, and a quantity $C_{mk}$ representing the concentration of the said chemical element measured by the sensor in the primary coolant;
a stage of calculating an estimated value $C_{ek+1}$ for the concentration of the said chemical element in the primary coolant in step k+1 based on the representative quantities $q_{dk}$, $q_{ck}$, $C_{mk}$ acquired in step k.

In the course of the initialisation stage an initial estimated value $C_{e0}$ is selected for the boron concentration of the primary coolant. This value is calculated directly from the quantity $C_{m0}$ representing the concentration of the said chemical element measured by the sensor at the moment when the iterative process is initiated or immediately prior thereto. This value is calculated using a single measurement made by the sensor, and is not the mean of several measurements made by the sensor at several instants. The calculation of $C_{e0}$ does not involve measurement of the quantities representing the injected flows of dilution solution or concentrated solution.

The acquisition stage is performed using one or more flow sensors in the REA circuit, and using the boron meter.

The calculation stage is carried out with the help of Kalman equations.

Kalman filtering is a known modelling process and only a few theoretical elements will be mentioned below. The application of Kalman filtering to estimation of the boron concentration of the primary coolant will be detailed below.

The Kalman filter is designed to model the state of a process characterised by a state vector x. It is based on the following two equations.

Equation for change in the state vector:

$$x_{k+1} = Ax_k + Bu_k + w_k.$$

Observation equation:

$$y_k = Dx_k + v_k.$$

The equation for change in the state vector corresponds to modelling of the process, u being a control and w being noise (modelling noise and/or control noise). The state vector x for the process is the quantity for which an attempt at estimation is made. It may have one or more dimensions, each coordinate of the vector corresponding to a characteristic parameter in the process.

The measurement vector y is a function of the state x and the measurement noise v. y has the same dimension as x.

A, B and D are square matrices, having the same dimension as x.

The Kalman filter makes it possible to weight the information obtained from the previous controls in advance against measurements made during operation and available at a particular time. This weighting is optimal if noises v and w, which are assumed to be independent, having a mean of zero and known covariance, are Gaussian. They can be used to minimise the mathematical expectation of the error between the state and its estimate.

The Kalman filter equations for the discrete state are as follows.

In the text below $\underline{x}_{k|k}$ represents the best estimate of $x_k$ obtained from the data available in step k, that is to say before measurement $y_{k+1}$ is available. Likewise, $\underline{x}_{k+1|k}$ and $\underline{y}_{k+1|k}$ represent the best estimates of $x_{k+1}$ and $y_{k+1}$ which can be obtained from the data available in step k, that is to say before measurement $y_{k+1}$ is available.

The equation of state gives:

$$\underline{x}_{k+1|k} = A\underline{x}_{k|k} + Bu_k.$$

The estimation error is given by:

$$x_{k+1} - \underline{x}_{k+1|k} = A[x_k - \underline{x}_{k|k}] + w_k.$$

The covariance matrix for the estimation error $x_{k+1} - \underline{x}_{k+1|k}$ is represented by $P_{k+1|k}$. As the noise w from the covariance matrix W is independent of the estimate, we obtain:

$$P_{k+1|k} = AP_{k|k}A^T + W$$

The predicted measurement $\underline{y}_{k+1|k}$ and the covariance matrix for the associated error $Q_{k+1|k}$ can likewise be deduced from the observation equation:

$$\underline{y}_{k+1|k} = D\underline{x}_{k+1|k}$$

$Q_{k+1|k} = DP_{k+1|k}D^T + V$, where V is the covariance matrix for noise v.

Once measurement $y_{k+1}$ is known, we obtain $$\underline{x}_{k+1|k+1} = \underline{x}_{k+1|k} + K_{k+1}(y_{k+1} - \underline{y}_{k+1|k}), \text{ i.e.:}$$

$$\underline{x}_{k+1|k+1} = \underline{x}_{k+1|k} + K_{k+1}(y_{k+1} - D\underline{x}_{k+1|k})$$

where $K_{k+1} = P_{k+1|k}D^T(DP_{k+1|k}D^T + V)^{-1}$
and the expression for the covariance matrix for the estimation error is deduced from this:

$$P_{k+1|k+1} = P_{k+1|k} - K_{k+1}DP_{k+1|k}, \text{ i.e.:}$$

$$P_{k+1|k+1} = (I - K_{k+1}D)P_{k+1|k}$$

where I is the identity matrix.

To sum up, the Kalman equations are as follows:

Prediction equations:

$$x_{k+1|k} = A x_{k|k} + B u_k$$

$$P_{k+1|k} = A P_{k|k} A^T + W$$

Filtering equations:

$$K_{k+1} = P_{k+1|k} D^T (D P_{k+1|k} D^T + V)^{-1}$$

$$x_{k+1|k+1} = x_{k+1|k} + K_{k+1}(y_{k+1} - D x_{k+1|k})$$

$$P_{k+1|k+1} = (I - K_{k+1} D) P_{k+1|k}$$

Application of these equations to estimation of the boron concentration in primary coolant will now be described.

The state parameter and the measured parameter considered for application of the Kalman equations differ according to whether the charge injected into the primary circuit is a charge of water or a charge of concentrated boron solution, or again if nothing is injected, as indicated in the table below. In practice a distinction is made between two cases, switching between the two forms of the state parameter and between the two forms of the measured parameter taking place according to the flow of concentrated solution.

|  | State parameter x | Measured parameter y |
| --- | --- | --- |
| Flow of concentrated solution zero | $x = \ln(C(t))$ | $y = \ln(C_m)$ |
| Flow of concentrated solution not zero | $x = \ln(C^* - C(t))$ | $y = \ln(C^* - C_m)$ |

The measured parameter is obtained directly from the boron concentration measured by the boron meter, $y = \ln(C_m)$ (dilution) or $y = \ln(C^* - C_m)$ (boron addition). The value $C^*$ considered in the formulae for the state and measured parameters (if the flow of concentrated solution is not zero) corresponds to the boron concentration of the concentrated solution.

The Kalman equations adapted for estimation of the boron concentration are scalar and become:

Prediction equations:

$$x_{k+1|k} = x_{k|k} + u_k$$

with $u_k = -(\Delta t_k / \text{Vol}) q_k$, where $\Delta t_k$ is the duration of time step k, which is considered to be constant, and $q_k$ is the injection flow at instant k, $q_k$ being taken to be equal to $q_{dk}$ when the flow of concentrated solution is zero, and being taken to be equal to $q_{ck}$ when the flow of concentrated solution is not zero.

$$P_{k+1|k} = P_{k|k} + W$$

where P is the variance of the state parameter x, and W is the variance of the noise w.

Filtering equations:

$$x_{k+1|k+1} = x_{k+1|k} + K_{k+1}(y_{k+1} - x_{k+1|k})$$

$$P_{k+1|k+1} = (1 - K_{k+1}) P_{k+1|k}$$

with $K_{k+1} = P_{k+1|k}/(P_{k+1|k} + V)$, where V is the variance of noise v.

As FIG. 1 shows, for each step k the calculation stage comprises a sub-stage of appropriately rewriting the state and measured parameters, followed by a calculation sub-stage. In the course of the rewriting sub-stage the form of the state and measured parameters is first selected according to the representative value of the flow of concentrated solution obtained at the acquisition stage. Then, still within the rewriting sub-stage, initial values of the state and measured parameters which have to be considered for the calculation sub-stage are estimated from the final values obtained in step k−1. If the form of the state and measured parameters is the same in step k and step k−1, the initial values of the state and measured parameters which have to be considered in step k are the same as the final values obtained in step k−1. Conversely, if the forms of the state and measured parameters differ between step k and step k−1, the final values of the state and measured parameters obtained in step k−1 have to undergo a conversion in order to obtain the initial values which have to be considered for step k.

The two sub-stages of the calculation stage are carried out using the same microprocessor.

Figure 2:
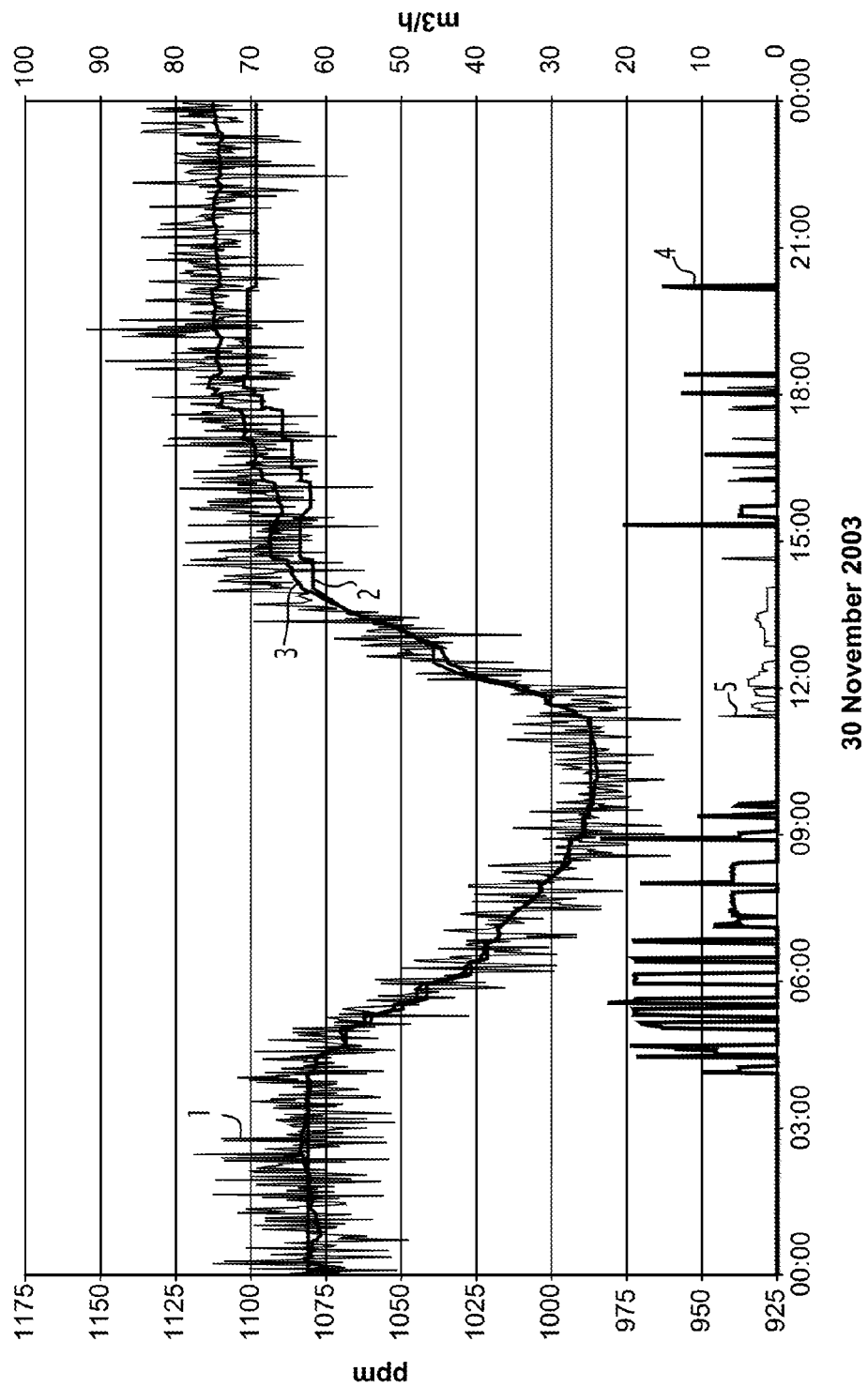
FIG. 2 is a graphical illustration showing the change in the boron concentration in the primary coolant over one day, expressed as ppm (left-hand scale), measured by the boron meter (line 1), estimated by the flow integration process (line 2), and estimated by the process according to the invention (line 3), the figure also showing the change in the injected flows of water (line 4) and concentrated boron solution (line 5) over the day, expressed as cubic meters per hour (right-hand scale)
Figure 5:
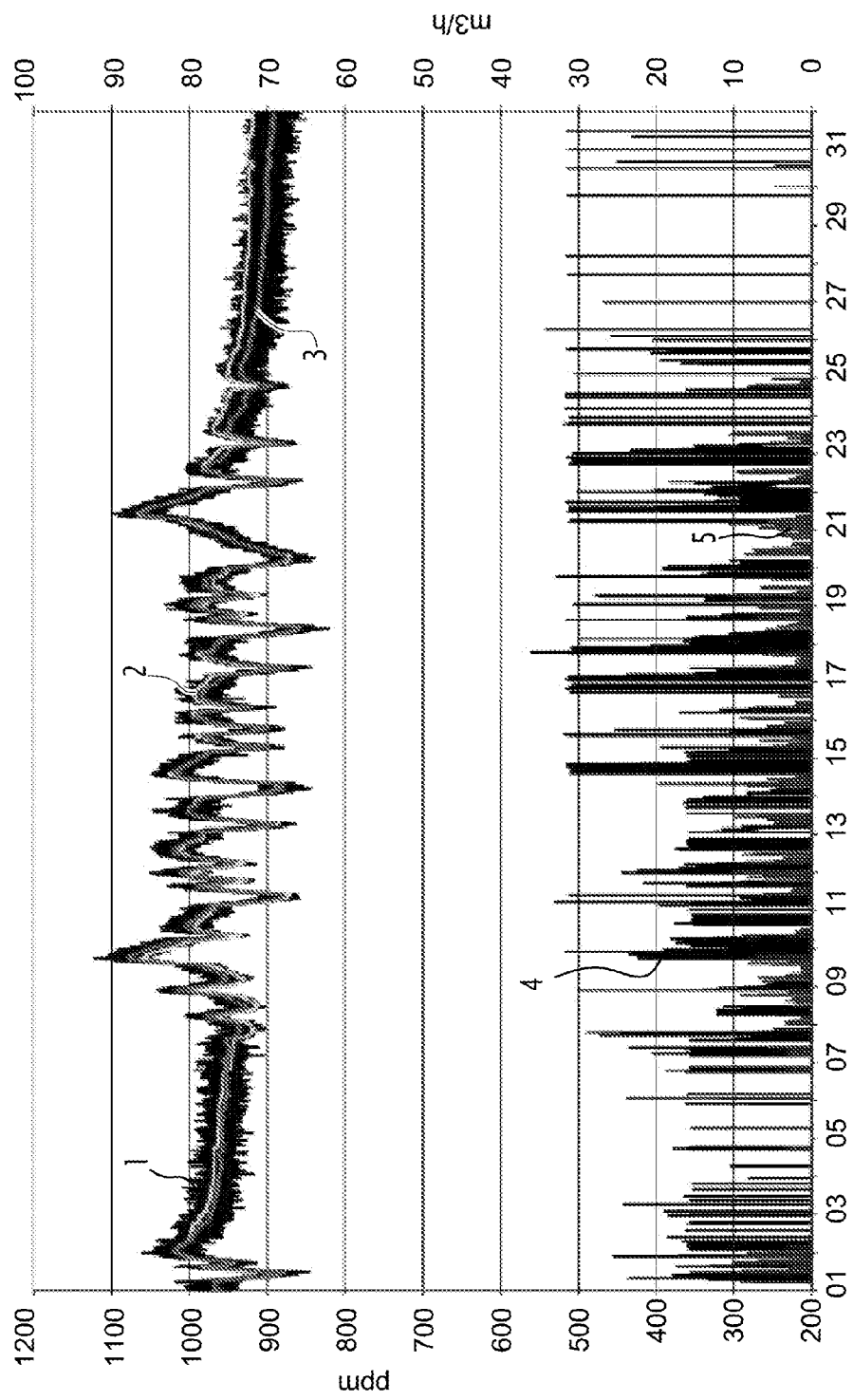
Figure 6:
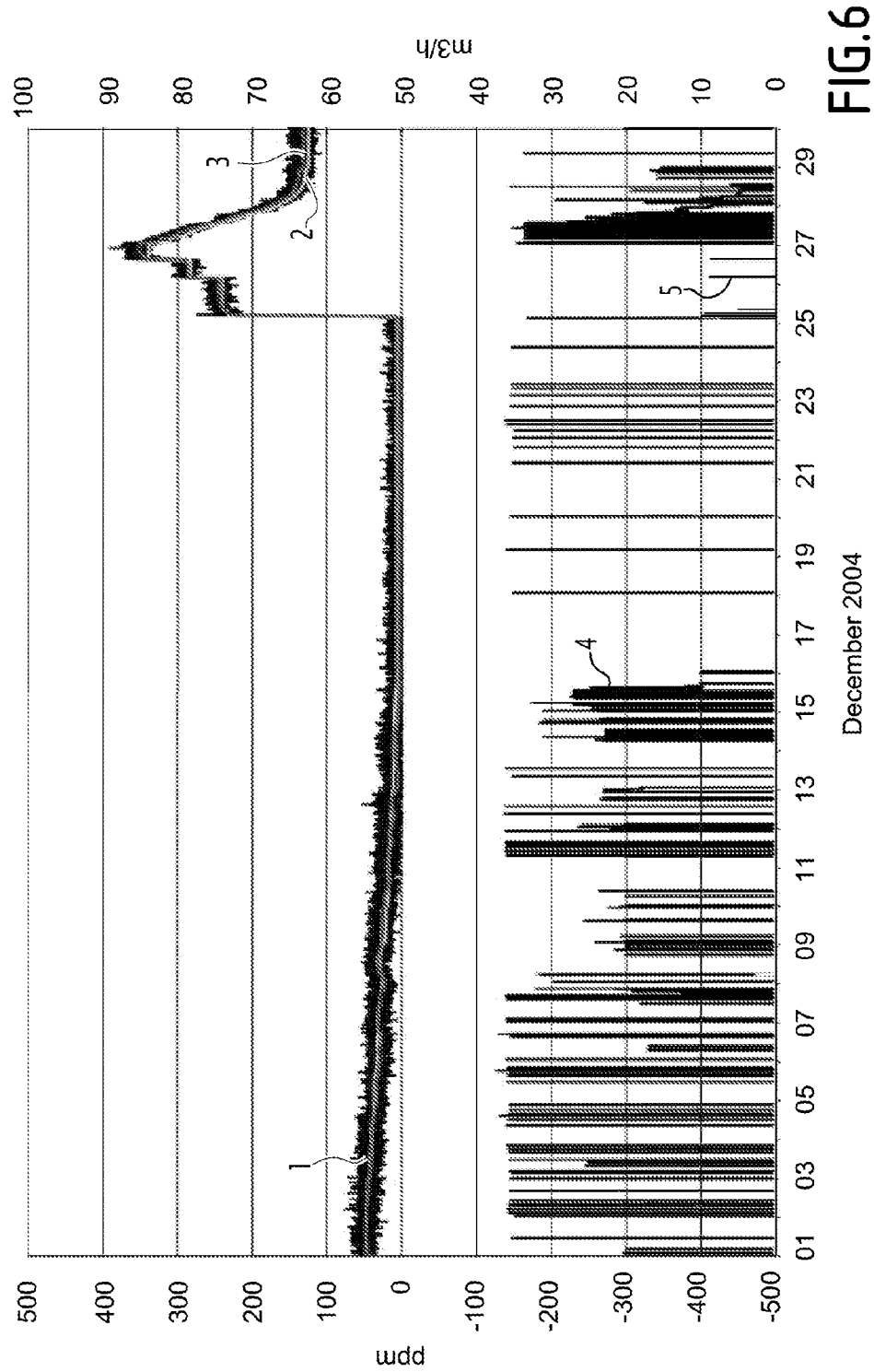

Comparative performance of the process of estimation using Kalman filtering and the other processes mentioned above (direct measurement and flow integration) have been evaluated for three burn-ups of cycle 13 at the Cattenom 1 nuclear power station in France, over periods of one month, so as to estimate any drift—November 2003 for the start of the cycle (FIG. 4), January 2004 for the middle of the cycle (FIG. 5) and December 2004 for the end of the cycle (FIG. 6). The comparative performance for the short-term reproduction of the actions of boron addition or dilution have been evaluated for a particular day under load, the 30 Nov. 2003, again for the Cattenom 1 nuclear power station (FIG. 2).

As FIGS. 2 and 4 to 6 illustrate, combined use of the control information (start of injection) and boron concentration measurements makes it possible to cumulate the advantages of the flow integration method and the process by directly using the values read by the boron meters. Appropriate adjustment of the V/W ratio can be used to adjust the respective weights for control and measurement.

The V/W ratio is generally chosen to be between 100 and 10000, preferably between 1000 and 5000, and even more preferably around 2000. An increase in the V/W ratio emphasises control over measurement. It can therefore be used to follow injections of water or concentrated boron solution more faithfully, but may yield estimates which are further from the measured value. Conversely, a smaller V/W ratio emphasises measurement over control. It provides estimates which are closer to measurements, but follows the injection of water or concentrated boron solution with a longer delay.

As in the case of the flow integration process, the boron concentration estimated by Kalman filtering quickly follows changes in boron concentration due to actions of boron addition or dilution. It will be seen in FIGS. 2 and 4 to 6 that when the boron concentration changes as a result of the injection of water or boron, the Kalman filter closely follows the flow integration method in the short term. It is here that the benefit of reducing the delay in comparison with measured boron concentration lies.

In the longer term the Kalman filter follows the measured values, subject to the injections of water or concentrated boron solution being well spaced out. There is therefore no long-term drift as in the flow integration method (see for example the last few days in FIG. 5) because the Kalman filter resets itself in relation to the measured value. The problem of delay in measurement of the actual boron concentration is also eliminated, because measurements are only really taken into account when there is no rapid change in the boron concentration due to control (injections from the REA).

Unlike the integration process, this method makes it possible to see changes in boron concentration which are not directly due to the injection of charges from the REA, because the measurements are taken into account, but with however the delay inherent in measurement if the changes are fast.

Figure 3:
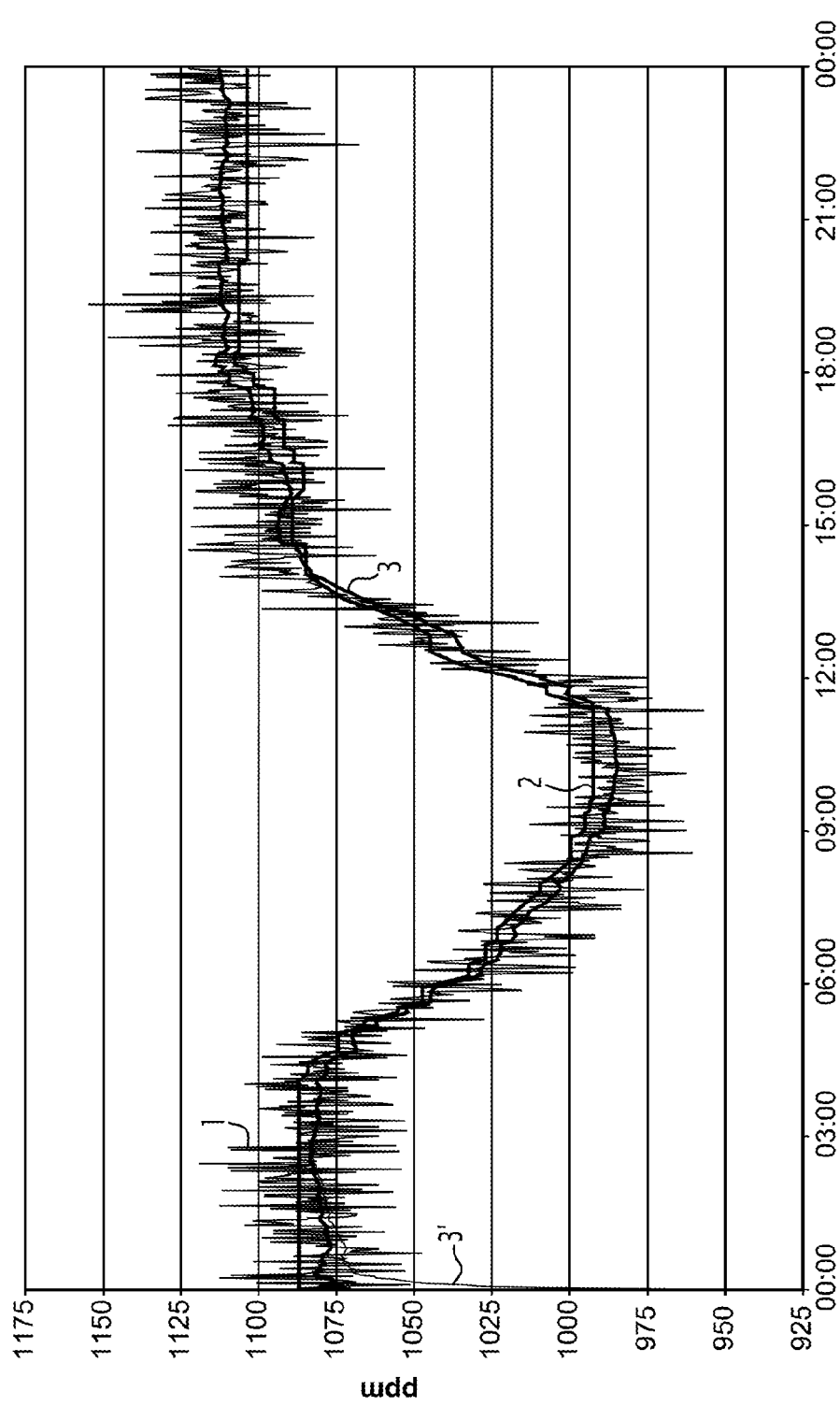
FIG. 3 is a graphical illustration similar to that in FIG. 2 showing the change in the boron concentration of the primary coolant estimated using the process according to the invention initialised normally using the first measurement from the boron meter (line 3), estimated using the process according to the invention initialised using an aberrant value of 500 ppm (line 3') and estimated by the flow integration process initialised using the first measurement from the boron meter (line 2)

Furthermore, there is absolutely no need to introduce an accurate initial boron concentration at the initialisation stage. The Kalman filter reconstitutes the boron concentration on the basis of the measured value in a few moments, starting from any initial value. However, the more accurate the initial value the more quickly the estimated boron concentration will reach the value that it would have had with accurate initialisation. By way of example, with an initial difference of 100 ppm the difference is less than 1 ppm after 25 minutes. FIG. 3 illustrates the behaviour of the Kalman filter with an aberrant initialisation of 500 ppm (line 3') instead of approximately 1075 ppm (line 3 corresponding to initialisation using the measured boron concentration). Lines 3 and 3' converge quickly and overlap less than three hours after initialisation. The fact of taking the first boron concentration value measured by the boron meter (as in the case of line 3) is a practical method of initialisation which yields a small initial difference from the true concentration (of the order of 25 ppm at most) and very rapid convergence.

Figure 4:
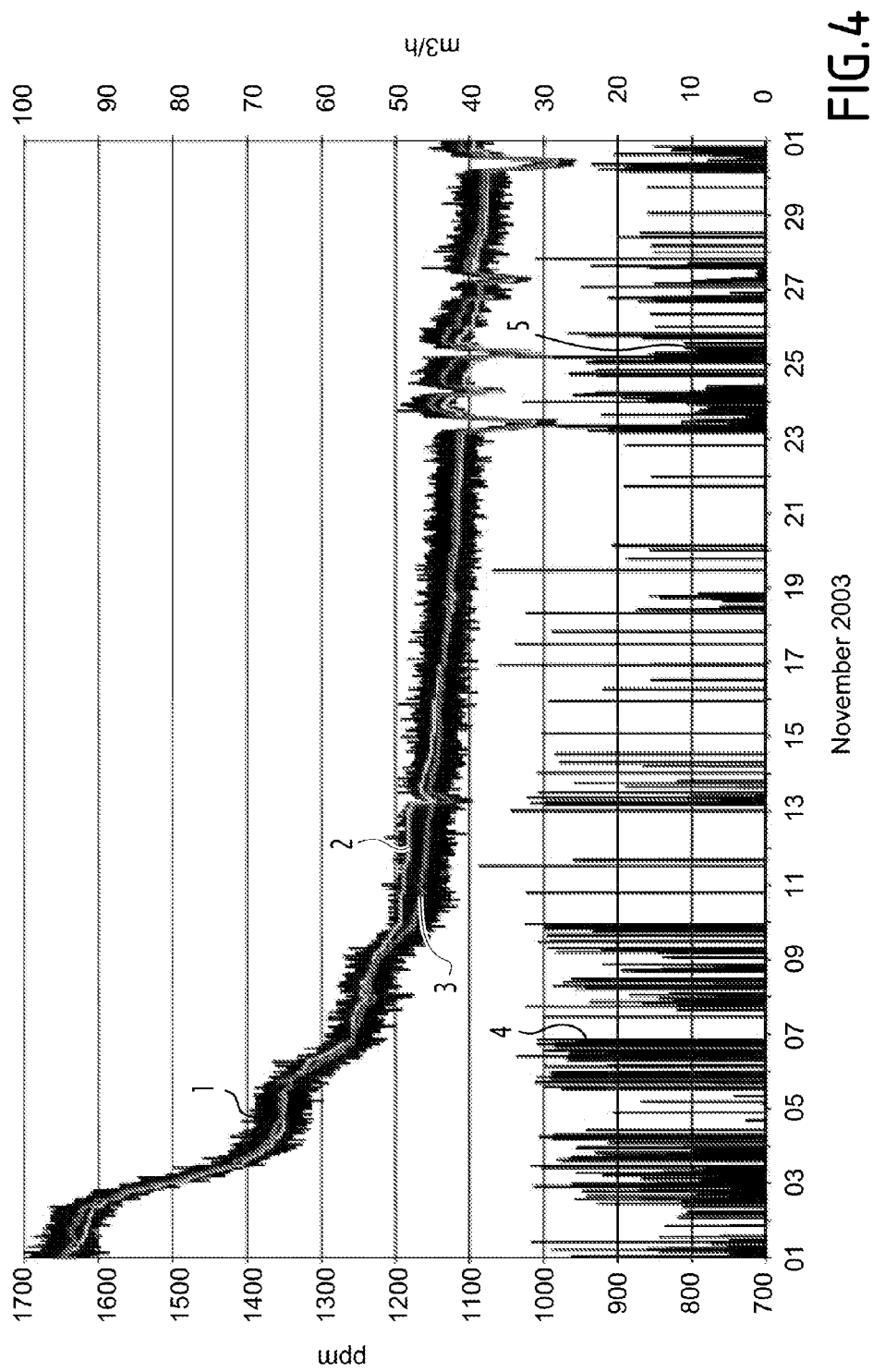
FIGS. 4 to 6 are graphical illustrations similar to that in FIG. 2 and show the change in boron concentration in the primary coolant and the injected flows for three periods in one month in an actual situation of the operation of a nuclear power station.

In addition to this, the process using the Kalman filter brings about a significant reduction in noise in comparison with measurement alone (reduction by a factor of 10 over 24 hour stability in November 2003 in FIG. 4).

In order to improve the accuracy of short-term modelling, the delays (of the order of ten minutes or so) due to the time required for homogenisation of the charge injected into the primary coolant and the time for the injected charge to flow through the primary circuit can be taken into account. The flow time may be reflected by a time offset of a few minutes (pure delay) in the injected flows. Likewise the introduction of a time constant (first order filtering of flows) can be used to simulate the effects of homogenisation of the charge injected into the primary circuit. These improvements are only useful for increasing the accuracy of the estimated boron concentration on the scale of a few minutes after injection.

It is also possible to take the dead volume in the REA injection pipe at the end of each injection into account. In fact, the charges of water and concentrated boron solution pass through the same injection pipe. Furthermore, the charges are never wholly injected, a small dead volume remaining in the injection pipe when injection is complete. This volume is of the order of a hundred liters or so. Each new charge injected <<pushes out>> the remaining dead volume of the preceding charge into the primary pipe. The dead volume effect therefore appears when the REA successively injects two charges of a different nature, water then concentrated boron solution or vice versa. This effect can be taken into account in modelling by considering that when a charge of a different nature from the previous one is injected, injection of the previous charge continues as long as a volume equivalent to the dead volume has not been injected. Without making this addition to the simulation, the estimated boron concentration may temporarily differ from the true concentration by 3 to 8 ppm after the end of the second injection.

The use of a Kalman filter therefore makes it possible to reconstruct the true boron concentration on the basis of the dilution and boron addition flows, but also on the basis of measurement of the boron concentration, in a very satisfactory way.

Because the information on boron concentration in the primary circuit is obtained without delay and with reduced noise, applications in which this information has to be compared with other information can take place faster and the comparison can be more detailed. Thus for example, in a monitoring system which involves a neutron calculation model, the estimated boron concentration is compared with the theoretical boron concentration calculated in order to check the behaviour of the neutron model. The boron concentration can also be compared with a threshold in order to detect reactivity accidents, such as untimely dilution In addition to this, calculation of the volumes of water or concentrated boron solution which have to be injected by operators based on estimated boron concentration will be more accurate. It is to be expected that the core of the reactor will be controlled through finer actions, so that there will be fewer injections of charges into the primary coolant, and therefore that the volume of radioactive effluents produced by these injections will be reduced.

Furthermore, resort to chemical determination by sampling the primary coolant may also be reduced. These determinations are particularly longwinded. In particular, during periodical tests, where an accurate measurement of boron concentration is required, the number of samples which have to be taken and analysed will be smaller. This will result in an appreciable time saving.

The process described above may have many variants.

The process may be applied to estimation of the concentration of a chemical element in the primary coolant of a reactor other than boron.

The process may be applied to any type of nuclear reactor in which the concentration of a liquid element in the primary coolant is controlled by the injection of a dilution solution or a concentrated solution of the said chemical element.

In the process it is possible to consider that the injections of dilution solution and concentrated solution all take place with the same predetermined flow. In this case the stage of acquiring quantities representing the flows for injection of dilution solution and concentrated solution are limited to merely establishing at each step whether or not the injection of dilution solution from the REA circuit is in progress or whether or not the injection of concentrated solution from the REA circuit is in progress.

Likewise, the duration of each time step $\Delta t_k$ may be regarded as being constant, or can be regarded as being variable.

The concentration C* of the concentrated solution is not necessarily equal to 7000 ppm, and may be different.

The stage of initialising the process may be carried out in many ways. It may be carried out as described above using the first measurement made by the sensor, but in a non-preferred way it may also be carried out by considering the mean of the measurements made by the sensor over a particular period of time, or even by arbitrarily fixing the concentration value at a given value.

The dilution solution may be a solution which is virtually wholly free of the chemical element, for example technically pure water, or may be a solution containing a small concentration of the chemical element in comparison with the primary coolant, for example a concentration of less than 100 ppm.

Switching between the two forms of the state and measured parameters in the first calculation sub-stage may be carried out not only on the basis of whether the flow of concentrated solution is zero or not, but rather on the basis that the quantity $q_c$ representing this flow is or is not lower than a predetermined limit. This limit is chosen to be small in comparison with a nominal injection flow for the concentrated solution.

The invention claimed is:

1. A process for estimating the concentration (C) of a chemical element in the primary coolant of a nuclear reactor, the reactor comprising means for injecting a solution for diluting the concentration of said chemical element below a predetermined limit into the primary coolant, means for injecting a concentrated solution of said chemical element having a predetermined concentration (C*) into the primary coolant, and a sensor able to measure a quantity ($C_m$) representing the concentration of said chemical element in the primary coolant, wherein the process is an iterative process comprising repeatedly in each time step k:
- a stage of acquisition of a quantity ($q_{dk}$) representing the injected flow of the dilution solution in step k, a quantity ($q_k$) representative of the injected flow of concentrated solution in step k, and a quantity ($C_{mk}$) representing the concentration of said chemical element measured by the sensor in the primary coolant;
- a stage of calculating an estimated value ($C_{ek+1}$) for the concentration of said chemical element in the primary coolant in step k+1 based on the representative quantities ($q_{dk}$, $q_{ck}$, $C_{mk}$) acquired in step k.

2. A process according to claim 1, wherein the calculation stage is carried out with the help of Kalman equations.

3. A process according to claim 2, wherein the stage of calculation in step k is carried out by considering in the Kalman equations a state parameter $x=\ln(C)$ when the quantity ($q_k$) representing the injected flow of concentrated solution is below a predetermined limit and a state parameter $x=\ln(C^*-C)$ when the quantity ($q_k$) representing the injected flow of the concentrated solution is above said predetermined limit.

4. A process according to claim 3, wherein the calculation stage in step k is carried out by considering in the Kalman equations a measured parameter $y=\ln(C_m)$ when the quantity ($c_{ck}$) representing the injected flow of concentrated solution is below a predetermined limit and a state parameter $y=\ln(C^*-C_m)$ when the quantity ($q_k$) representing the injected flow is above said predetermined limit.

5. A process according to claim 4, wherein the equations used in the calculation stage are:

$$\underline{x}_{k+1/k}=\underline{x}_{k/k}+u_k$$

$u_k=-(\Delta t_k/\text{Vol})\, q_{dk}$ when the quantity ($q_{ck}$) representing the injected flow of concentrated solution in step k is below a predetermined limit $u_k=-(\Delta t_k/\text{Vol})\, q_{ck}$ when the quantity ($q_{ck}$) representing an injected flow of concentrated solution in step k is above a predetermined limit $$P_{k+1/k}=P_{k/k}+W$$

$$\underline{x}_{k+1/k+1}=\underline{x}_{k+1/k}K_{k+1}(y_{k+1}-\underline{x}_{k+1/k})$$

$$P_{k+1/k+1}=(1-K_{k+1})P_{k+1/k}$$

$$K_{k+1}=P_{k+1/k}/(P_{k+1/k}+V)$$

where $x_{k/k}$ is the value of state parameter x in step k determined from the data available in step k, $\Delta t_k$ is the duration of time step k, Vol is the volume of the primary circuit, $P_{k/k}$ is the variance for the state parameter x in step k determined from the data available in step k, and W and V are predetermined constants.

6. A process according to claim 5, wherein the V/W ratio lies between 100 and 10000.

7. A process according to claim 1, wherein it comprises an initialisation stage in the course of which an initial estimated value ($C_{e0}$) for the concentration of said chemical element in the primary coolant is calculated directly from the quantity ($C_{m0}$) representing the concentration of said chemical element measured by the sensor in the primary coolant.

8. A process according to claim 1, wherein the chemical element is boron or a boron compound.

9. A process according to claim 1, wherein the nuclear reactor is a pressurised water nuclear reactor.

* * * * *

UNITED STATES PATENT AND TRADEMARK OFFICE
CERTIFICATE OF CORRECTION

PATENT NO. : 8,489,338 B2
APPLICATION NO. : 12/521422
DATED : July 16, 2013
INVENTOR(S) : Claude Verneret It is certified that error appears in the above-identified patent and that said Letters Patent is hereby corrected as shown below:

In the Claims

Col. 10 line 62 – Col. 11 line 14 should read

--1. A process for estimating the concentration (C) of a chemical element in the primary coolant of a nuclear reactor, the reactor comprising means for injecting a solution for diluting the concentration of said chemical element below a predetermined limit into the primary coolant, means for injecting a concentrated solution of said chemical element having a predetermined concentration ($C^*$) into the primary coolant, and a sensor able to measure a quantity ($C_m$) representing the concentration of said chemical element in the primary coolant, wherein the process is an iterative process comprising repeatedly in each time step k :

- a stage of acquisition of a quantity ($q_{dk}$) representing the injected flow of the dilution solution in step k, a quantity ($q_{tk}q_{ck}$) representative of the injected flow of concentrated solution in step k, and a quantity ($C_{mk}$) representing the concentration of said chemical element measured by the sensor in the primary coolant ;

- a stage of calculating an estimated value ($C_{ek+1}$) for the concentration of said chemical element in the primary coolant in step k+1 based on the representative quantities ($q_{dk}$, $q_{ck}$, $C_{mk}$) acquired in step k.--

Signed and Sealed this
Third Day of September, 2013

Teresa Stanek Rea
*Acting Director of the United States Patent and Trademark Office*

CERTIFICATE OF CORRECTION (continued)
U.S. Pat. No. 8,489,338 B2

In the Claims

Col. 11 line 32 – Col. 12 line 21 should read

--5. A process according to Claim 4, wherein the equations used in the calculation stage are :

$x_{k+1/k} = x_{k/k} + u_k$ $u_k = -(\Delta t_k/Vol) q_{dk}$ when the quantity ($q_{ck}$) representing the injected flow of concentrated solution in step k is below a predetermined limit $u_k = -(\Delta t_k/Vol) q_{ck}$ when the quantity ($q_{ck}$) representing an injected flow of concentrated solution in step k is above a predetermined limit $P_{k+1/k} = P_{k/k} + W$ $x_{k+1/k+1} = x_{k+1/k} \pm K_{k+1} (y_{k+1} - x_{k+1/k})$ $P_{k+1/k+1} = (1 - K_{k+1}) P_{k+1/k}$ $K_{k+1} = P_{k+1/k} / (P_{k+1/k} + V)$ where $x_{k/k}$ is the value of state parameter x in step k determined from the data available in step k, $\Delta t_k$ is the duration of time step k, Vol is the volume of the primary circuit, $P_{k/k}$ is the variance for the state parameter x in step k determined from the data available in step k, and W and V are predetermined constants.--